United States Patent [19]
Hamaguchi

[11] Patent Number: 6,091,561
[45] Date of Patent: Jul. 18, 2000

[54] MAGNETIC RECORDING/REPRODUCTION APPARATUS WHICH SIMULTANEOUSLY SCANS TWO CONTINUOUS TRACKS IN BOTH STANDARD AND LONG PLAY MODES

[75] Inventor: Toshihide Hamaguchi, Osaka, Japan

[73] Assignee: Sanyo Electric Co., Ltd., Moriguchi, Japan

[21] Appl. No.: 08/250,578

[22] Filed: May 27, 1994

[30] Foreign Application Priority Data

May 31, 1993 [JP] Japan ................................. 5-154390
May 31, 1993 [JP] Japan ................................. 5-154391

[51] Int. Cl.$^7$ ........................... G11B 15/14; G11B 5/00
[52] U.S. Cl. .............................................. 360/64; 360/8
[58] Field of Search ................................ 360/32, 39, 64, 360/66, 103, 36.1, 40, 10.1, 10.2, 8; 358/335

[56] References Cited

U.S. PATENT DOCUMENTS

| | | | |
|---|---|---|---|
| 4,740,847 | 4/1988 | Watanabe et al. | 360/66 |
| 4,870,509 | 9/1989 | Nagasawa et al. | 360/9.1 |
| 4,897,739 | 1/1990 | Hasegawa et al. | 360/37.1 |
| 5,121,265 | 6/1992 | Hirose et al. | 360/64 |
| 5,325,240 | 6/1994 | Okada et al. | 360/39 |
| 5,377,050 | 12/1994 | Yun | 360/32 |

FOREIGN PATENT DOCUMENTS

| | | |
|---|---|---|
| 507 083 | 10/1992 | European Pat. Off. . |
| 554 867 | 8/1993 | European Pat. Off. . |
| 37 22 577 | 1/1988 | Germany . |
| 38 19 393 | 12/1988 | Germany . |
| 40 14744 | 11/1990 | Germany . |

OTHER PUBLICATIONS

Patent Abstracts of Japan, vol. 12, No. 418 (E–678) Nov. 7, 1988 of JP63–155877 (Sony Corp.) Jun. 29, 1988.
Patent Abstracts of Japan, vol. 16, No. 279 (E–1220) Jun. 22, 1992 of JP04–068884 (Hitachi Ltd.) Mar. 4, 1992.
"A Study on Long Time Mode Recording for Home Use Digital VTR", Proceedings of National Conference of Institute of Electronics, Information and Communication Engineers of Japan, 1–382, Spring, 1990.

*Primary Examiner*—W. Chris Kim
*Attorney, Agent, or Firm*—Armstrong, Westerman, Hattori, McLeland & Naughton

[57] ABSTRACT

A magnetic recording/reproduction apparatus of an azimuth system for recording/reproducing a digital signal by helical scanning a magnetic tape has an SP mode and an LP mode having recording/reproducing time period N (N is an even number) times that of SP mode. The apparatus includes a pair of magnetic head units with opposite azimuth, disposed in close proximity on a circumferential face of a rotary head cylinder with difference in level therebetween corresponding to a predetermined track pitch t for scanning simultaneously two continuous tracks at that pitch. The cylinder is rotated at the same rotation speed in both SP and LP modes, while the tape travel speed is reduced to 1/N that of SP mode when LP mode is specified. When LP mode is specified, the data amount of a digital signal to be recorded is compressed to 1/N that in SP mode, which are provided to the magnetic heads 2-channel record data, and the data amount of reproduced 2-channel digital signals of is expanded by N. In SP mode, recording/reproduction is carried out by every 2 continuous tracks by the pair of magnetic heads for every 1 for rotation of the cylinder. In LP mode, recording/reproduction is carried out in a unit of 2 continuous tracks by the pair of magnetic heads for every N rotations of the cylinder.

5 Claims, 14 Drawing Sheets

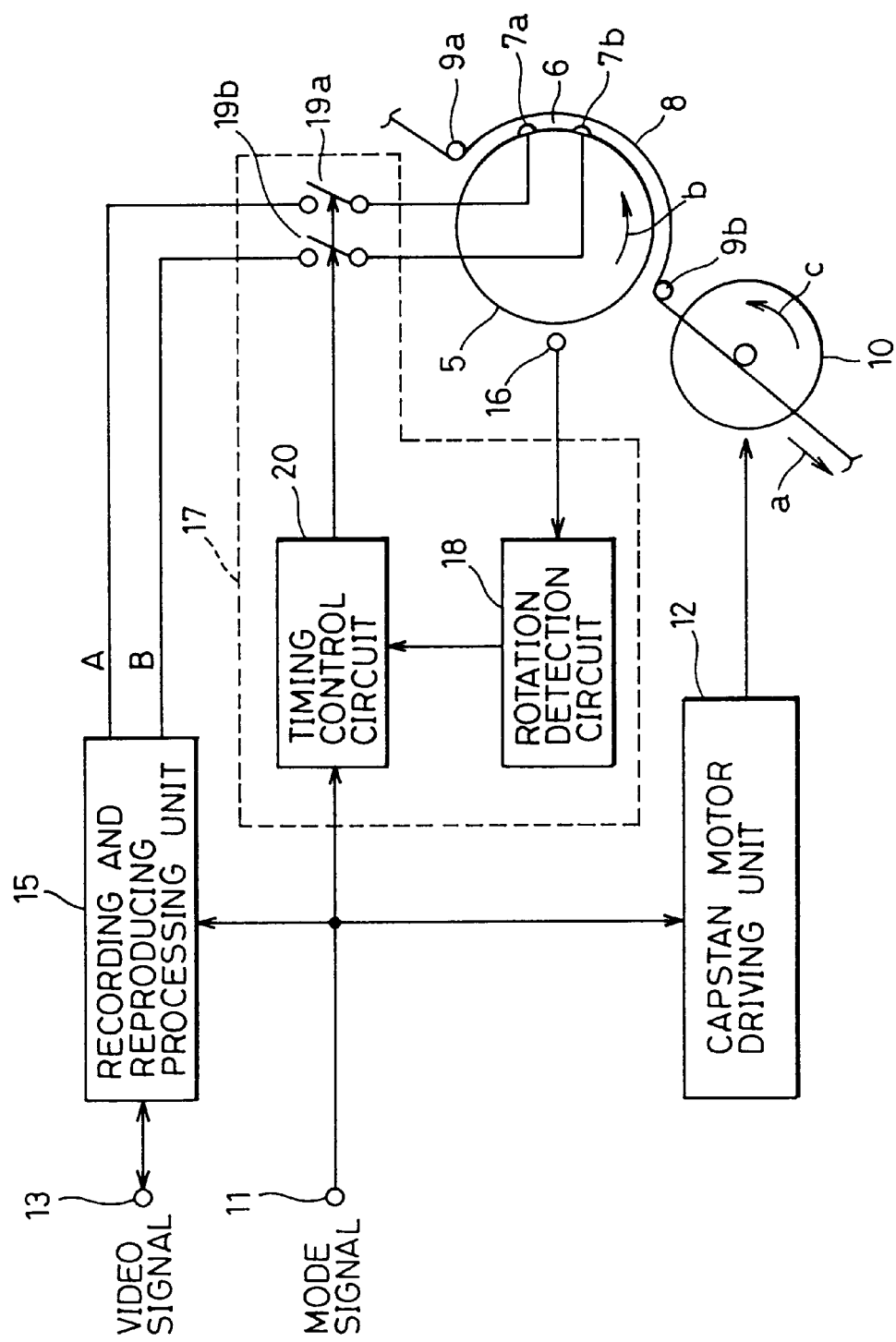

MAGNETIC RECORDING/REPRODUCTION APPARATUS WHICH SIMULTANEOUSLY SCANS TWO CONTINUOUS TRACKS IN BOTH STANDARD AND LONG PLAY MODES

BACKGROUND OF THE INVENTION

1. Field of the Invention

The present invention relates to a magnetic recording/reproduction apparatus including a long play mode, and more particularly, to a helical scan system magnetic recording/reproduction apparatus that can record and/or reproduce analog or digital information in a long play mode in addition to a standard play mode.

2. Description of the Related Art

In the field of conventional digital magnetic recording/reproduction apparatuses that record and/or reproduce digital information using a helical scan and azimuth recording/reproduction system, research efforts are expended on employing a long play mode (referred to as LP mode hereinafter) in addition to the standard play mode (referred to as SP mode hereinafter) as recording/reproduction modes. The potential of such a long play mode is discussed in, for example, "A Study on Long Time Mode Recording for Home Use Digital VTR", Proceedings of National Conference of Institute of Electronics, Information and Communication Engineers of Japan, 1-382, Spring, 1990. In such a digital magnetic recording/reproduction apparatus, recording and reproduction of high definition television broadcasting having a great amount of information is desired in addition to the recording and reproduction of the current NTSC system and PAL system television broadcasting. However, a specific structure is not yet known for realizing both the SP mode and the LP mode, or for recording/reproducing various broadcasts differing in amount of information by a conventional digital magnetic recording/reproduction apparatus.

A conventional digital magnetic recording/reproduction apparatus generally has two magnetic heads 2a and 2b with opposite azimuth mounted on the circumferential face of a rotary head cylinder 1, at locations spaced apart by 180° from each other, as shown in FIG. 1. The manner of attaching the magnetic heads to a cylinder is basically similar to that in a VTR of a general VHS system. In the drawing, the positive symbol "+" indicates the azimuth of head 2a (referred to as azimuth A hereinafter), and the negative symbol "−" indicates the azimuth of head 2b (referred to as azimuth B hereinafter).

According to the structure shown in FIG. 1, heads 2a and 2b helically-scan a magnetic tape (not shown) alternately for each half rotation of cylinder 1 by rotating cylinder 1 at a constant speed while winding and running the magnetic tape around cylinder 1 at a predetermined angle in a recording/reproduction operation.

Particularly in a recording/reproduction operation of the SP mode, the travel speed in the tape is controlled so that the scanning position of the head on the magnetic tape is shifted by every predetermined one track pitch substantially corresponding to the width of the head.

In response to a rotation detection pulse (referred to as RF pulse) of high frequency in synchronization with the rotation of cylinder 1, generated by a detection means (not shown), heads 2a and 2b are alternately selected as recording or reproducing heads for every half rotation of cylinder 1.

As a result, in a recording operation of a SP mode, a track 4a of azimuth A and a track 4b of azimuth B are alternately formed on a magnetic tape 3 with a predetermined track pitch t for each half rotation of cylinder 1 in response to the RF pulse, whereby a plurality of blocks of record data D1, D2, D3, . . . , each corresponding to half rotation of cylinder 1, i.e. corresponding to 1 track, are continuously recorded on the formed plurality of tracks, as shown in FIG. 2. The arrows a and b in FIG. 2 indicate the tape travel direction and the head scanning direction, respectively. When the data to be recorded has a great amount of information such as video and audio data, the data to be recorded is compressed to several times smaller than the original amount of data by high efficiency coding, and then recorded.

A digital magnetic recording/reproduction apparatus is envisioned including, in addition to the above-described SP mode, a long play mode that realizes a recording and reproducing time period N times that of the SP mode. In order to realize recording and reproduction in a LP mode that is N times the recording and reproducing time period of a SP mode, basically it is necessary to reduce the tape travel speed in the LP mode to 1/N the tape travel speed of the SP mode. This also applies to the case of the so-called EP mode of a VHS system VTR.

Assuming that the rotation speed of a cylinder is maintained at a speed identical to that of the SP mode while the tape travel speed is reduced to 1/N of that in the SP mode in a conventional digital magnetic recording/reproduction apparatus, tracks will be formed in a sequentially overwritten manner, whereby the track pitch in the recording/reproduction operation of a LP mode is narrowed to 1/N the track pitch of a SP mode. In other words, the track density on a tape in a LP mode becomes N times that in the SP mode to reduce the level of a signal reproduced from each track. This leads to reduction of the S/N ratio of recording and reproduction in the LP mode.

A possible consideration is that the track pitch formed on a tape in a LP mode can be maintained identical to that of the SP mode by compressing the amount of data of the information to be recorded/reproduced at a data compression rate N times that of the SP mode to reduce the original amount of information to 1/N, and by reducing the tape travel speed and the rotation speed of the cylinder to 1/N those of the SP mode. For example, using the heads of the structure shown in FIG. 1, if the tape speed and the rotation speed of cylinder 1 are reduced to 1/N those of the SP mode in the recording and reproducing operation of a LP mode, the track pattern on a magnetic tape will be scanned at a predetermined track pitch t for every half rotation of cylinder 1, similar to the track pattern in the SP mode of FIG. 2.

However, the above-described structure requires a change of the rotation speed of the cylinder in response to switching between the SP mode and the LP mode, giving rise to a problem that a complex control system is needed.

Because the relative speed between the tape and the head in a recording and reproducing operation is significantly lower in the LP mode than in the SP mode, the level of a signal reproduced in the LP mode is greatly reduced to also lower the frequency thereof (1/N). It is therefore necessary to broaden the characteristics of reproduction circuitry such as electromagnetic conversion system and waveform equalization to wide band characteristics that covers frequency as low as 1/N in comparison with the circuitry characteristics where only the SP mode is assumed. Because the output level of a signal reproduced in a LP mode is greatly degraded as described above, the S/N ratio of a reproduced output of head is significantly reduced. One approach in solving these problems involves by setting the rotation speed of the cylinder to 1/N the rotation speed of the SP mode only during a recording operation of the LP mode, and setting the rotation speed of the cylinder to two times that of the reproducing operation, i.e., equal to that of the SP mode, in a reproducing operation of the LP mode. However, in such a case, a magnetic head of a width sufficiently wider than the track pitch must be used to properly trace the track formed on the tape in a reproducing operation. Furthermore, a complex control system is required to control the switching of the rotation speed of the cylinder and for controlling tracking.

Thus, various disadvantages are generated when recording and reproduction is to be carried out at a track pitch identical to that of the SP mode in an LP mode in a conventional digital magnetic recording/reproduction apparatus. If the cylinder rotation speed in an LP mode is maintained identical to that of an SP mode while reducing only the tape travel speed to 1/N of that of the SP mode to solve these disadvantages, the track pitch becomes 1/N that of the SP mode to reduce the level of a reproduced signal, as described before. An approach as set forth in the following solves the above-described problems while maintaining the rotation speed of the cylinder at the same speed.

For the sake of simplicity, a case where the recording/reproducing time period of an LP mode is set to two times that of an SP mode, i.e. N=2, will be described below. In an LP mode, it is assumed that the tape travel speed is reduced to ½ of that in the SP mode while maintaining the rotation speed of the cylinder equal to that of an SP mode. The above-described problems of increasing the complexity of the cylinder rotation control and change in the reproduced signal characteristics can be eliminated by a structure in which the scanning position of the head on a tape is not shifted by each track pitch t for every half rotation of cylinder 1 as in an SP mode, but shifted by a track pitch t for every one (=N/2) rotation of cylinder 1. However, the head used for recording and reproduction will be limited to either head 2a or 2b, in other words, only a track of either azimuth A or B is formed on the tape. This means that recording and reproduction of the azimuth system cannot be carried out.

In order to enable an azimuth system recording/reproducing operation, an intermittent recording and reproduction operation can be considered wherein recording/reproduction of two tracks is carried out by heads 2a and 2b during a rotation of cylinder 1, recording/reproduction is not carried out during the next rotation, and recording/reproduction of two tracks is carried out by heads 2a and 2b during a second next rotation of cylinder 1. FIG. 3 shows a track pattern on a tape 3 according to such an intermittent operation. Since the rotation speed of cylinder 1 is identical to that of the SP mode in the example shown in FIG. 3, the frequency of the RF pulse is identical to that of the RF pulse in the LP mode of FIG. 2. In FIG. 3, each of record data blocks D1', D2', D3', . . . is the data of each of record data blocks D1, D2, D3, . . . of the SP mode of FIG. 2 having the amount of data compressed to ½ and recorded on each track by every 2 blocks. The period of a RF pulse illustrated by the hatched region in FIG. 3 indicates an idle period where the above-described recording/reproduction is not carried out.

Although recording/reproduction in an azimuth system using heads 2a and 2b is possible according to the structure shown in FIG. 3, a track of azimuth B will be overwritten on a track of azimuth A. Therefore, the pitch of the track of azimuth A is narrowed to ½, so that the track pitch of an LP mode cannot be maintained identical to that of an SP mode.

The above-described various problems are expected to occur, not only in a magnetic recording/reproduction apparatus carrying out recording and reproduction in a digital system, but also in a magnetic recording/reproduction apparatus of an analog system. For example, the problem of the track pitch formed on a tape being narrowed in an LP mode to reduce the S/N ratio due to the aforementioned reason will also occur in a helical scan system magnetic recording/reproduction apparatus such as a conventional VHS system VTR or 8 mm VTR that carries out analog recording/reproduction. There is also a problem that the mechanical accuracy of the mechanism of the magnetic head and the rotary cylinder must be extremely critical in order to ensure compatibility in a LP mode between different apparatuses.

SUMMARY OF THE INVENTION

An object of the present invention is to provide a magnetic recording/reproduction apparatus that realizes an LP mode having favorable signal recording/reproduction characteristics with a simple structure.

Another object of the present invention is to provide a magnetic recording/reproduction apparatus that can carry out recording/reproduction of a LP mode at an track pitch identical to that of an SP mode.

A further object of the present invention is to provide a magnetic recording/reproduction apparatus that has narrowing of a track pitch on a tape in an LP mode prevented and the S/N ratio of a reproduced signal improved.

Still another object of the present invention is to provide a magnetic recording/reproduction apparatus that eliminates the necessity of complex control for switching the cylinder rotation speed by maintaining the rotation speed of a rotary head cylinder in a recording/reproduction operation of an LP mode identical to that of an SP mode.

A still further object of the present invention is to provide a magnetic recording/reproduction apparatus that eliminates the necessity of altering the recording/reproduction circuit characteristics for a recording/reproduction operation of an LP mode.

Yet a further object of the present invention is to provide a magnetic recording/reproduction apparatus that can carry out azimuth system recording/reproduction in a recording/reproduction operation of an LP mode.

Yet another object of the present invention is to provide a magnetic recording/reproduction apparatus that allows recording/reproduction of various broadcasting differing in the amount of information.

According to an aspect of the present invention, a magnetic recording/reproduction apparatus of an azimuth system that records and/or reproduces a digital signal by helical-scanning a magnetic tape includes a standard play mode and a long play mode of a recording and reproducing time period N (N is an even number) times the recording and reproducing time period of the standard play mode as recording and reproducting modes. The magnetic recording/reproduction apparatus includes a mode specifying terminal, a rotary head cylinder, a pair of magnetic heads, a tape speed control unit, a signal processing unit, and a head control unit. The mode specifying terminal receives a mode signal that specifies one of the standard play mode and the long play mode to be carried out. The rotary head cylinder is driven to rotate at the same rotation speed in either of the standard play mode and the long play mode. The pair of magnetic heads, each having an azimuth opposite to each other, are disposed in close proximity on the circumferential face of the rotary head cylinder with a difference in level therebetween in the direction of the rotating axis corresponding to a predetermined track pitch, so that two continuous tracks are scanned simultaneously at the predetermined track pitch on the magnetic tape for every one rotation of the rotary head cylinder. The tape speed control unit reduces the travel speed of the magnetic tape running while being wound around the rotary head cylinder to 1/N the travel speed of the standard play mode when the long play mode is specified. The signal processing unit compresses the amount of data of a digital signal to be recorded to 1/N the amount of data of the standard play mode to provide the compressed data to the pair of magnetic heads as record data of 2 channels, and expanding the amount of data of digital signals of 2 channels reproduced by the pair of magnetic heads by N times, when the long play mode is specified. The head control unit drives the pair of magnetic heads to carry out recording or reproduction by the pair of magnetic heads in a unit of two continuous tracks on the magnetic tape, for every one rotation of the rotary head cylinder when the standard play mode is specified, and for every N rotations of the rotary head cylinder when the long play mode is specified.

According to another aspect of the present invention, an azimuth system magnetic recording/reproduction apparatus for recording and/or reproducing a digital signal by helical-scanning a magnetic tape includes a standard play mode and a long play mode of a recording and reproducting time period N times that of the standard play mode as recording and reproducing modes. The magnetic recording/reproduction apparatus includes a mode specifying terminal, a rotary head cylinder, a pair of magnetic heads, a tape speed control unit, a signal processing unit, and a head control unit. The mode specifying terminal receives a mode signal specifying one of the standard play mode and the long play mode to be executed. The rotary head cylinder is driven to rotate at the same rotation speed in either of the standard play mode and the long play mode. The pair of magnetic heads, each having an azimuth opposite to each other, are disposed in close proximity on the circumferential face of the rotary head cylinder with no difference in level therebetween so as to continuously scan the same track on the magnetic head for every one rotation of the rotary head cylinder. The tape speed control unit reduces the tape travel speed of the magnetic head running while being wound around the rotary head cylinder to 1/N the travel speed of the standard play mode when the long play mode is specified. The signal processing unit compresses the amount of data of a digital signal to be record to 1/N the amount of data of the standard play mode, and expands the amount of data of a reproduced digital signal by N times, when the long play mode is specified. The head control unit alternately drives the pair of magnetic heads to carry out recording or reproduction in a unit of one track on the magnetic tape, for every one rotation of the rotary head cylinder when the standard play mode is specified, and for every N rotations of the rotary head cylinder when the long play mode is specified.

According to a further aspect of the present invention, an azimuth system magnetic recording/reproduction apparatus for recording and/or reproducing a signal by helical-scanning a magnetic head includes first and second modes differing in the amount of information that can be recorded and reproduced, as recording/reproduction modes. The magnetic recording/reproduction apparatus includes a mode specifying terminal, a rotary head cylinder, 2n (n is an integer of at least 2) magnetic heads, a tape speed control unit, and a head switching unit. The mode specifying terminal receives a mode signal specifying one of the first and second modes to be executed. The rotary head cylinder is driven to rotate at the same rotation speed in either of the first and second modes. The 2n magnetic heads are mounted on the circumferential face of the rotary head cylinder with approximately equal intervals, each magnetic head having an azimuth opposite to those of adjacent heads. The tape speed control unit reduces the travel speed of the magnetic tape running while being wound around the rotary head cylinder to 1/m (m is an odd number of 1<m<2n) that of the first mode when the second mode is specified. The head switching unit carries out head switching to select the 2n magnetic heads sequentially along the rotating direction of the rotary head cylinder for every rotation of the rotary head cylinder by approximately $(360/2n)°$ when the first mode is specified, and to select the 2n magnetic heads at (m−1) intervals of the magnetic heads along the rotating direction of the rotary head cylinder for every rotation of the rotary head cylinder by approximately $(360m/2n)°$ when the second mode is specified.

The main advantage of the present invention is to improve the S/N ratio of a reproduced signal in a long play mode by carrying out recording/reproduction of the long time mode at a track pitch identical to that of the standard play mode.

Another advantage of the present invention is to eliminate the need of complex control for switching the speed of the rotary head cylinder by maintaining the rotation speed of the rotary head cylinder in the long play mode identical to that of the standard play mode.

A further advantage of the present invention is to eliminate the need of altering circuit characteristics for recording/reproduction in a long play mode by maintaining the rotation speed of the rotary head cylinder in the long play mode identical to that of the standard play mode.

Still another advantage of the present invention is to allow azimuth system recording/reproduction while maintaining the track pitch in the long play mode identical to that of the standard play mode.

A still further advantage of the present invention is to allow recording/reproduction of various broadcasting differing in the amount of information while maintaining the track pitch in the long play mode identical to that of the standard play mode.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a block diagram schematically showing a magnetic recording/reproduction apparatus according to a first embodiment of the present invention.

DESCRIPTION OF THE PREFERRED EMBODIMENTS

Figure 1:
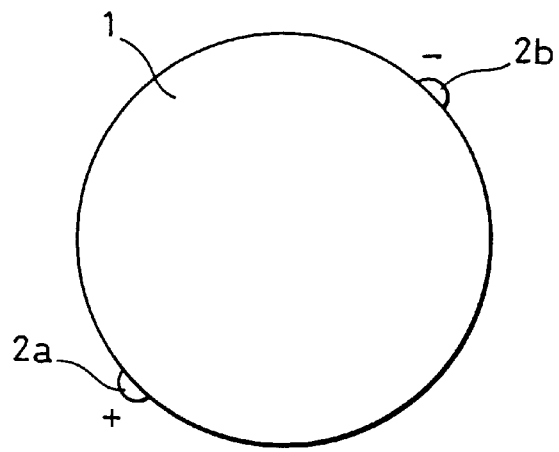
FIG. 1 is a plan view schematically showing a head arrangement of a conventional magnetic recording/reproduction apparatus.
Figure 5:
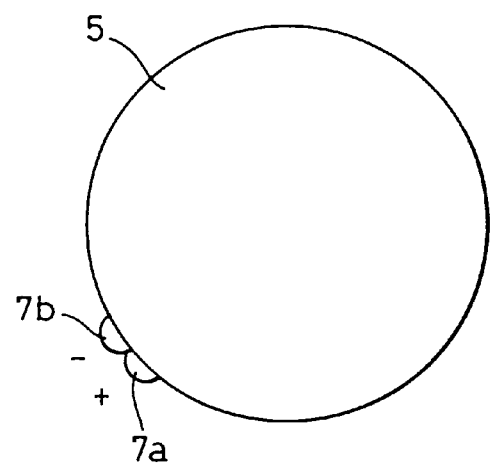
FIG. 5 is a plan view schematically showing the head arrangement of the first embodiment.
Figure 6:
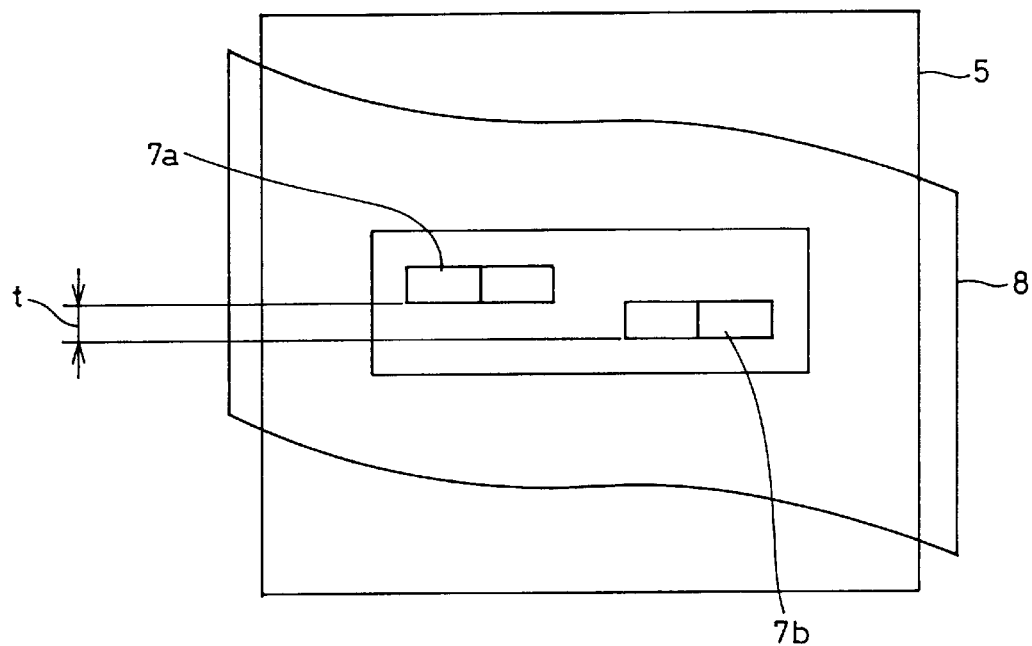
FIG. 6 is a front view schematically showing the head arrangement of the first embodiment.

Referring to FIG. 4, a magnetic recording/reproduction apparatus according to a first embodiment of the present invention includes a rotary head cylinder 5 rotating in the direction of arrow "b", having a double azimuth head 6 mounted on the circumferential face thereof. More specifically, double azimuth head 6 includes a pair of magnetic head units 7a and 7b disposed in close proximity as shown in the plan view of FIG. 5. Magnetic head unit 7a has an azimuth A, and magnetic head unit 7b has an opposite azimuth B, similar to those of magnetic heads 2a and 2b shown in FIG. 1. The two magnetic head units 7a and 7b are disposed in close proximity with a difference in level therebetween in the rotating axis direction corresponding to one track pitch t predetermined in advance according to the format, as shown in FIG. 6. The head width of magnetic head units 7a and 7b may be equal or different from each other.

By a pair of tape guides 9a and 9b provided in the proximity of rotary head cylinder 5, a magnetic tape 8 is wound around rotary head cylinder 5 over an angle of, for example, 180°, to travel in the direction of arrow "a" in a recording/reproduction operation by a capstan motor 10 rotating in the direction of arrow "c".

A mode signal is provided from a system controller (not shown) controlling the entire magnetic recording/reproduction apparatus to a mode terminal 11 specifying whether recording/reproduction in an SP mode or an LP mode is to be executed. The mode signal provided to mode terminal 11 is applied to a capstan motor driving unit 12, a recording and reproducing processing unit 15, and a head control unit 17. Capstan motor driving unit 12 controls the drive of capstan motor 10 according to the mode signal. A video signal to be recorded is provided from a video signal processing unit (not shown) to a record video terminal 13. The video signal to be recorded provided to terminal 13 is applied to recording and reproducing processing unit 15 which is controlled by the above-described mode signal. Recording and reproducing processing unit 15 digitally converts a video signal to be recorded and carries out time base compression thereon in a recording operation, and applies a time base expansion on data reproduced by double azimuth head 6 to convert the same into analog data in a reproduction operation.

A sensor 16 is provided in the proximity of rotary head cylinder 5 for detecting the phase and the frequency of the rotation of rotary head cylinder 5. Head control unit 17 includes a rotation detection circuit 18, a timing control circuit 20, and a pair of head selection switches 19a and 19b. According to an output of sensor 16, rotation detection circuit 18 forms RF pulses in synchronization with the rotation of rotary head cylinder to provide the pulses to timing control circuit 20. According to these RF pulses and the mode signal provided from mode terminal 11, timing control circuit 20 controls the pair of head selection switches 19a and 19b to open/close simultaneously the connection between the 2 channel outputs A and B of recording and reproducing processing unit 15 and the pair of magnetic head units 7a and 7b forming double azimuth head 6. Rotary head cylinder 5 is driven by a cylinder motor (not shown) to rotate in the direction of arrow "b" at the same rotation speed regardless of which mode of SP or LP is specified.

Although the present invention generally relates to a magnetic recording/reproduction apparatus that has an SP mode and an LP mode having the recording/reproduction time period N (N is an even number) times that of the SP mode as recording/reproduction modes, the following embodiments will be described in which N is being set as N=2 for the sake of simplification.

When a mode signal specifying the SP mode is applied to mode terminal 11, capstan motor driving unit 12 causes tape 8 to run in the direction of arrow "a" at a constant speed such that the scanning position of the pair of head units 7a and 7b on tape 8 is shifted by a predetermined one track pitch t for every half rotation of rotary head cylinder 5. When a mode signal specifying the LP mode is applied to mode terminal 11, capstan motor driving unit 12 reduces the travel speed of tape 8 to ½ the travel speed of the SP mode.

Because head units 7a and 7b are attached to rotary head cylinder 5 with a difference in level therebetween corresponding to a track pitch t as shown in FIG. 6, two continuous tracks each having a width of track pitch t on tape 8 are simultaneously scanned in parallel during a period corresponding to approximately half a rotation in every one rotation of rotary head cylinder 5.

The recording or reproducing operation in the SP mode will first be described. Since the scanning position on tape 8 by the pair of head units 7a and 7b is shifted by one track pitch t for every half rotation of rotary head cylinder 5 as described above, the scanning position is shifted by 2 track pitches in the SP mode. In a recording operation of the SP mode, a track 21a of azimuth A and a track 21b of azimuth B each having a width of one track pitch t are alternately formed as shown in the track pattern of FIG. 7 by the simultaneous parallel scanning in the unit of 2 tracks by the pair of head units 7a and 7b mounted on rotary head cylinder 5.

Since head units 7a and 7b scan tape 8 during a period corresponding to a half rotation in every one rotation of rotary head cylinder 5 as described above, timing control unit 20 simultaneously closes the pair of head selection switches 19a and 19b to simultaneously select head units 7a and 7b as recording or reproduction heads during half a period of an RF pulse from rotation detection circuit 18.

Figure 2:
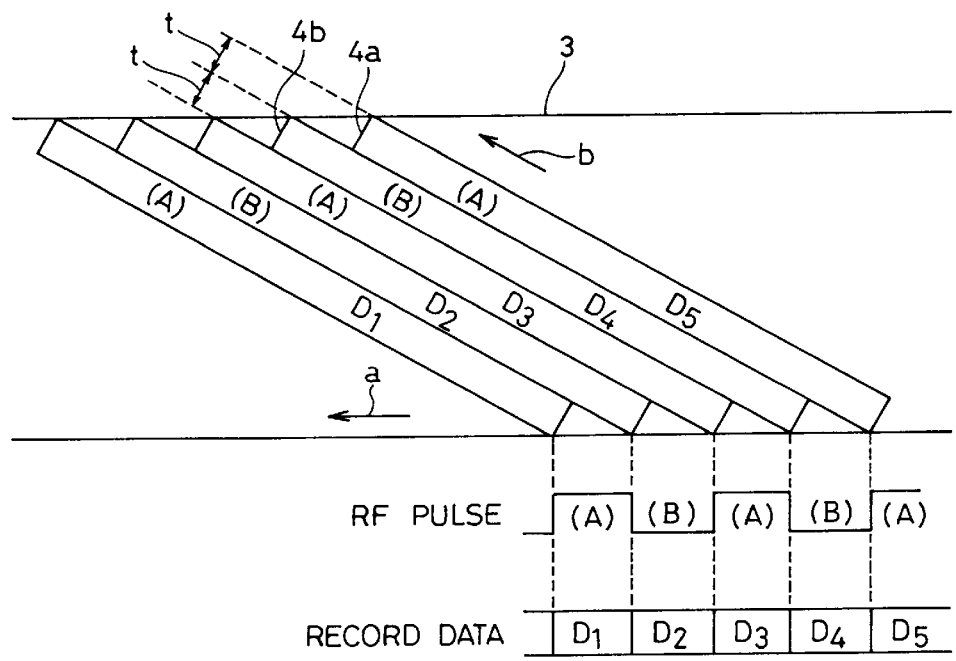
FIG. 2 shows an track pattern in a SP mode of a conventional magnetic recording/reproduction apparatus.
Figure 3:
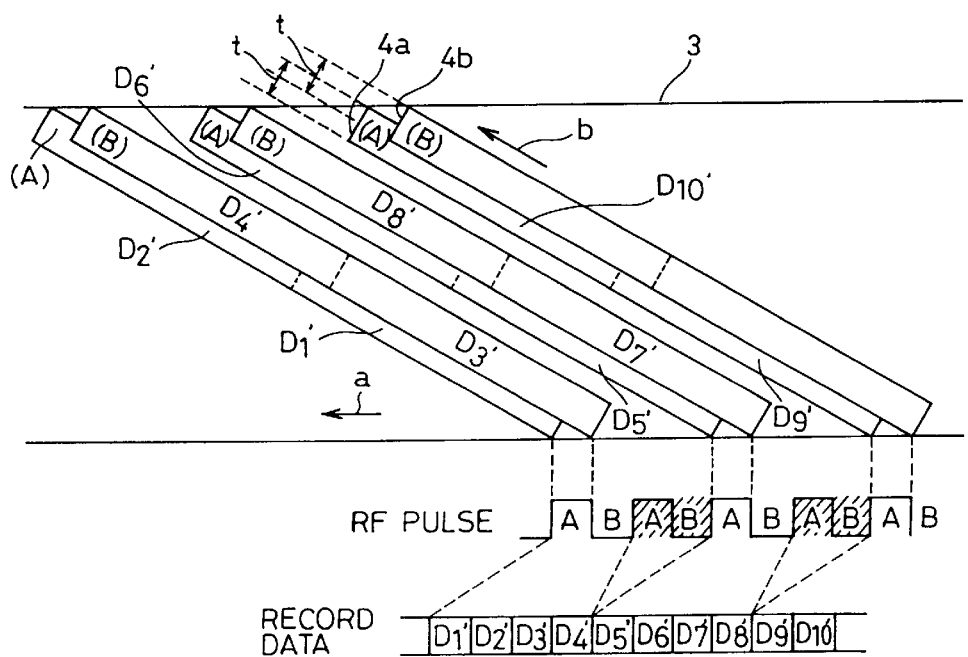
FIG. 3 shows a track pattern in an LP mode of a magnetic recording/reproduction apparatus.
Figure 8:
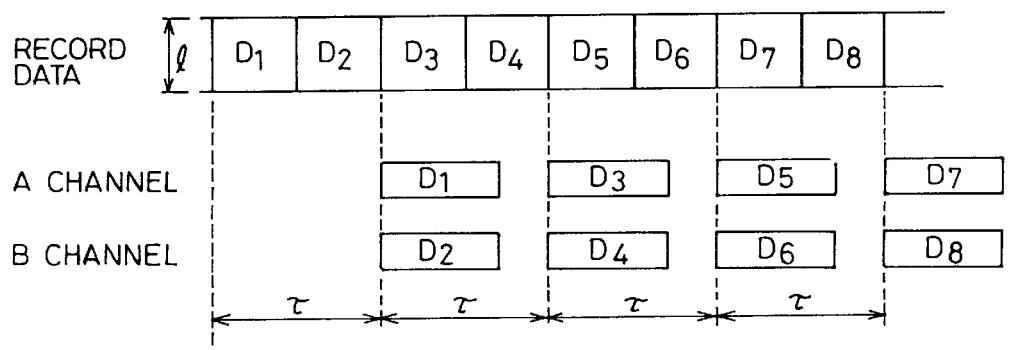
FIG. 8 shows a record data arrangement in an SP mode of the first embodiment.

In the recording operation, recording and reproducing processing unit 15 digital-converts a video signal to be recorded from terminal 13, whereby a plurality of record data blocks D1, D2, D3, . . . each corresponding to half a rotation of rotary head cylinder 5, i.e. corresponding to one track on tape 8, are formed in time sequence as shown in FIG. 8, similar to the record data of the prior art shown in FIG. 2. Identifying the data recorded/reproduced by the pair of head units 7a and 7b as data of channel A and channel B, respectively, recording and reproducing processing unit 15 alternately distributes the plurality of data blocks D1, D2, D3, . . . as data of channel A and channel B as shown in FIG. 8 to output the same in parallel at the same time during the half rotation period, where switches 19a and 19b are simultaneously closed, of each rotation of rotary head cylinder 5. In FIG. 8, $\tau$ indicates one rotation period of rotary head cylinder 5, i.e. one period of a RF pulse, and l indicates the amount of record data.

As described above, record data D1 and D2, D3 and D4, . . . , each having an amount of data corresponding to one track, are recorded simultaneously and in parallel on two continuous tracks 21a and 21b of azimuth A and B, respectively, on tape 8 during half a rotation of every one rotation of rotary head cylinder 5 by the pair of head units 7a and 7b. As a result, a track pattern of an azimuth recording system each having a width of one track pitch t is continuously formed on tape 8, similar to that of the conventional case shown in FIG. 2.

Next, a recording or reproduction operation in an LP mode having a recording/reproduction time period two times that of the SP mode will be described. In the LP mode, the rotation speed of rotary head cylinder 5 is maintained at the same rotation speed as that of the SP mode, while the travel speed of tape 8 is reduced to ½ the travel speed of the SP mode. According to this reduction of the tape travel speed, the scanning position on tape 8 by the pair of head units 7a and 7b is shifted by one track pitch t for every one rotation of rotary head cylinder 5, which is half the 2 track pitch 2t in the above-described SP mode.

Figure 7:
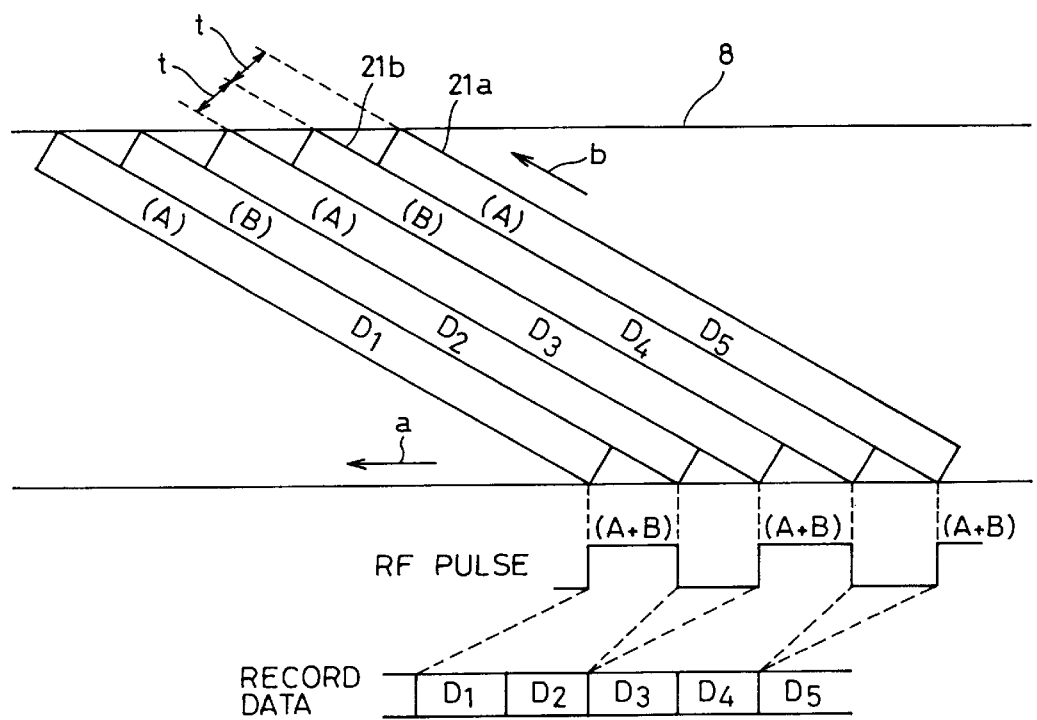
FIG. 7 shows a track pattern in an SP mode of the first embodiment.

Similar to the above-described SP mode of FIG. 7, timing control unit 20 simultaneously closes switches 19a and 19b during a period corresponding to one rotation of every 2 rotations of rotary head cylinder 5 by which the head scanning position on tape 8 is shifted by 2 track pitches 2t to simultaneously select head units 7a and 7b as record heads or reproduction heads in order to maintain the width of each track scanned by magnetic head units 17a and 17b at one track pitch t when the LP mode is specified.

Figure 9:
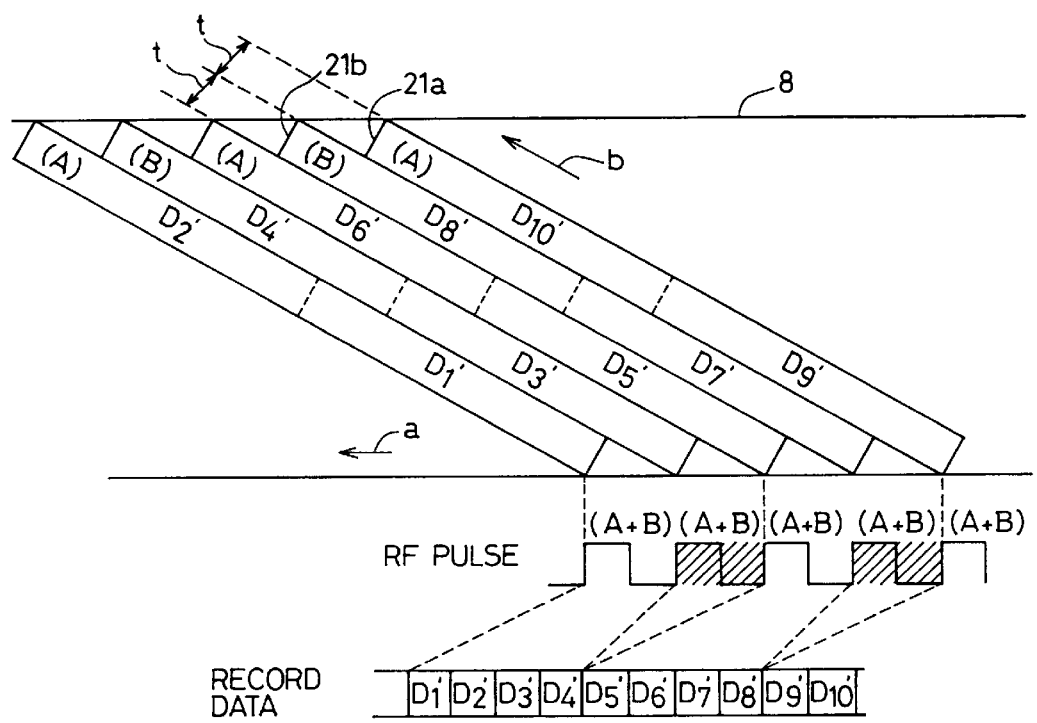
FIG. 9 shows a track pattern in an LP mode of the first embodiment.

By such a recording/reproduction in the unit of 2 tracks b by head units 7a and 7b for every 2 rotations of rotary head cylinder 5, track 21a of azimuth A and track 21b of azimuth B, each having a width of one track pitch t, are alternately scanned on tape 8 as shown in the track pattern of FIG. 9 in the recording/reproduction operation of the LP mode.

Figure 10:
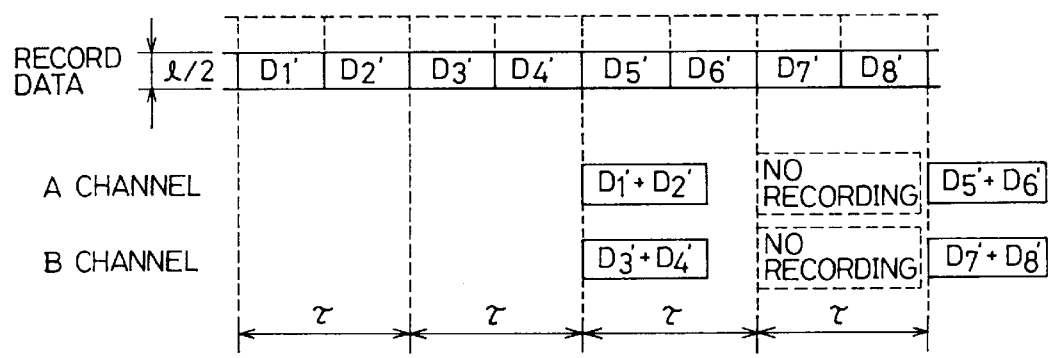
FIG. 10 shows a record data arrangement in an LP mode of the first embodiment.

Since the tape travel speed in the LP mode is reduced to ½ the tape travel speed of the SP mode, the recording or reproduction of one track 21a or 21b on tape 8 requires 2 (=N) times the time period of the SP mode. Therefore, the stored amount of information on tape 8 is reduced to ½ (=1/N) that of the SP mode. In a recording operation of the LP mode, recording and reproducing processing unit 15 reduces each data of record data blocks D1, D2, D3, . . . to compress the time base thereof to ½, whereby a plurality of record data blocks D1', D2', D3', . . . having the amount of information reduced to half are formed in time sequence, as shown in FIG. 10. Recording and reproducing processing unit 15 alternately distributes the formed data blocks in a unit of combination of two continuous data blocks such as D1'+D2', D3'+D4', D5'+D6', . . . as the record data of 2 channels of A and B to output the same in parallel at the same time during one rotation period, where switches 19a and 19b are closed, of every 2 rotations of rotary head cylinder 5. More specifically, the record unit of each channel, for example, each of D1'+D2', D3'+D4', D5'+D6', . . . has an amount of information compressed to that of one track.

The data of 2 channels provided in parallel from recording and reproducing processing unit 15 as shown in FIG. 10 are simultaneously recorded as shown in FIG. 9 as two continuous tracks of azimuth A and azimuth B, each having a width of one track pitch t on tape 8, intermittently for every other rotation of cylinder 5.

The frequency of RF pulses in the LP mode of FIG. 9 is identical to that of the RF pulses in the SP mode of FIG. 7. "1/2" in FIG. 10 indicates the amount of data of each of record data blocks D1', D2', . . . , implying that each is half the data amount "l" of each of record data blocks D1, D2, . . . of FIG. 8. In FIG. 9, the period of a RF pulse indicated by a hatched region implies an idle period where recording/reproduction is not carried out.

In a reproduction operation of the SP mode, switches 19a and 19b are closed during a period corresponding to half a rotation of each one rotation of cylinder 5 by timing control unit 20, similar to a recording operation in the SP mode. In a reproduction operation of the LP mode, switches 19a and 19b are closed during a period corresponding to one rotation of every 2 rotations of cylinder 5, similar to a recording operation of the SP mode. In either case, data reproduced from two continuous tracks 21a and 21b simultaneously scanned by head units 7a and 7b are provided to recording and producing processing unit 15 as data of 2 channels of A and B during the time period when switches 19a and 19b are closed. Recording and reproducing processing unit 15 applies a time base expansion and analog-conversion, opposite to those at the time of recording, on reproduced signals, which are provided from terminal 13 as a reproduced video signal of one channel.

Although the above embodiment was described in which N is set as N=2, the present invention is applicable to the case where N is an even number other than 2. According to the above-described embodiment of the present invention, two continuous tracks on a tape are scanned simultaneously for every one rotation of a rotary head cylinder by a double azimuth head 6 having a difference in level between head units corresponding to a predetermined track pitch t. As a result, in an SP mode, the head scan position on tape 8 is shifted by 2 tracks for every one rotation of rotary head cylinder 5 to carry out scanning in the unit of 2 tracks by a pair of head units 7a and 7b opposite in azimuth, so that an azimuth system recording/reproduction is allowed with a track pattern of a the predetermined track pitch. In an LP mode having a recording/reproduction time period N times that of the SP mode, scanning by head units 7a and 7b is carried out in the unit of 2 tracks for every shifting of the head scanning position by two tracks on magnetic tape 8 by N rotations of rotary head cylinder 5, allowing an azimuth system recording/reproduction with a track pattern of a track pitch identical to that of the SP mode.

By maintaining the rotation speed of rotary head cylinder 5 identical to that of the SP mode while reducing only the travel speed of tape 8 to 1/N in the LP mode, an azimuth recording/reproduction is possible with a track pitch identical to that of the SP mode. Therefore, the track pitch is prevented from being narrowed in the LP mode. This prevents reduction in the reproduced output as well as the deterioration of the S/N ratio in the LP mode. Furthermore, the drive control of rotary head cylinder will not become complicated.

Because the rotation speed of rotary head cylinder 5 is maintained equal to that of the SP mode even in the LP mode, the recording and reproducing circuitry characteristics in the LP mode does not have to be changed to those adapted for a band wider than that of the SP mode.

Figure 11:
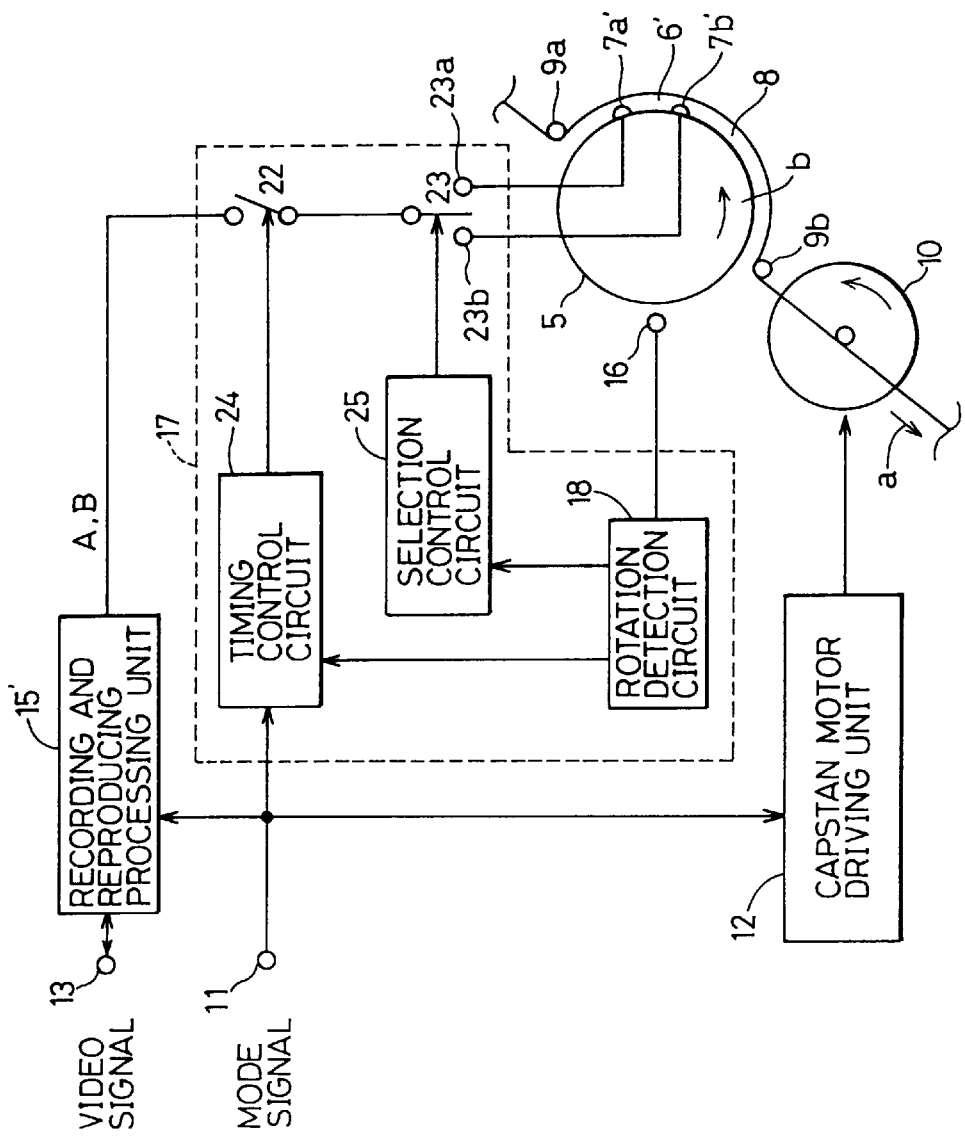
FIG. 11 is a block diagram schematically showing a magnetic recording/reproduction apparatus according to a second embodiment of the present invention.

A second embodiment of the present invention will be described hereinafter with reference to FIG. 11. The second embodiment of FIG. 11 is similar to the first embodiment shown in FIG. 4 except for the points set forth in the following. Therefore, description of common elements will not be repeated.

Figure 12:
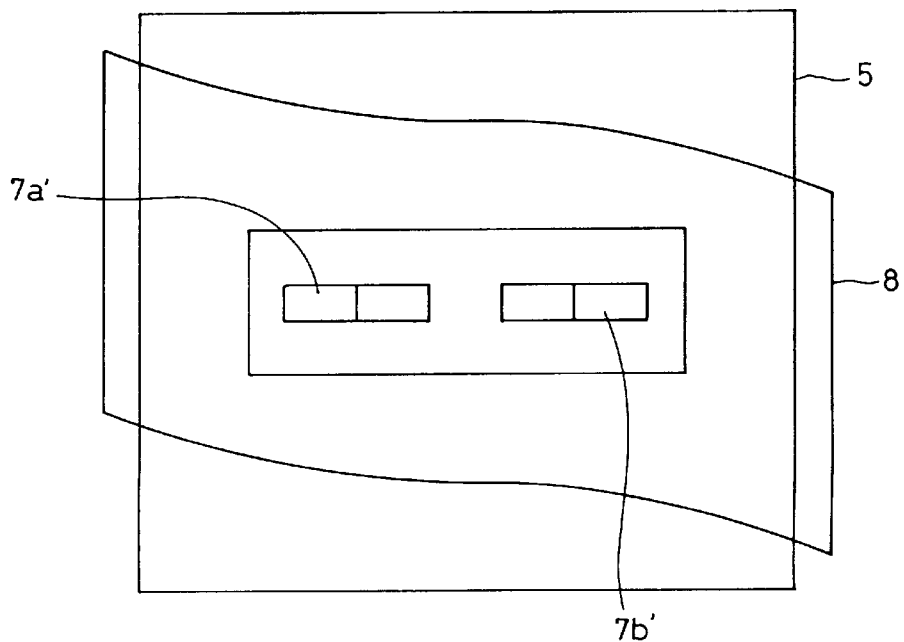
FIG. 12 is a front view schematically showing a head arrangement of the second embodiment.

A double azimuth head 6' mounted on the circumferential face of a rotary head cylinder 5 includes a pair of magnetic head units 7a' and 7b' provided with no difference in level therebetween, as shown in FIG. 12. A single-channel recording and reproducing processing unit 15' is provided instead of 2-channel recording and reproducing processing unit 15 of FIG. 4. Furthermore, instead of timing control unit 20 and the pair of switches 19a and 19b of FIG. 4, a mode switch 22, a head selection switch 23, a timing control circuit 24 controlling the open/close of mode switch 22, and a selection control circuit 25 for controlling the open/close of head selection switch 23 are provided as components constituting head control unit 17.

Since head units 7a' and 7b' with opposite azimuth A and B are mounted on rotary head cylinder 5 with no difference in level, the pair of head units 7a' and 7b' helical-scan the same track on tape 8 successively for every one rotation of rotary head cylinder 5. If the constant tape travel speed in an SP mode and an LP mode is identical to that of the first embodiment, the scanning position of head units 7a' and 7b' is shifted by every 2 track pitches 2t for every one rotation of rotary head cylinder 5 when in a SP mode.

In the present second embodiment, the rotation speed of rotary head cylinder 5 is set to two times that of the first embodiment, so that the scanning position of head units 7a' and 7b' is shifted by one track pitch t for every one rotation of rotary head cylinder 5 in the SP mode. Because head units 7a' and 7b' are selected alternately to record or reproduce data of one track for every one rotation of rotary head cylinder 5 in a recording or reproduction operation of the SP mode, timing control circuit 24 closes switch 22 during a period which is approximately half a rotation of every one rotation of rotary head cylinder 5. Head selection control circuit 25 alternately switches the moving contact of switch 23 between a contact 23a of the head 7a' side and a contact 23b of the head 7b' side for every one rotation of rotary head cylinder 5.

Figure 14:
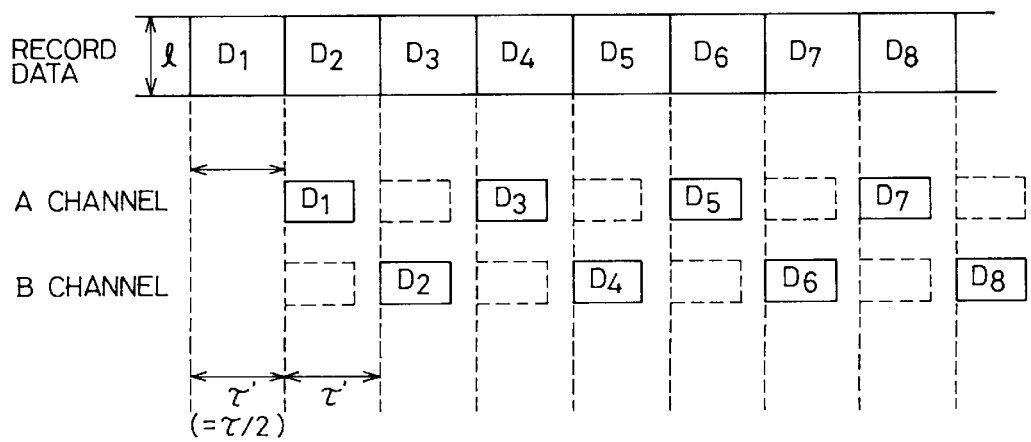
FIG. 14 shows a record data arrangement in an SP mode of the second embodiment.

In a recording operation of the SP mode, recording and reproducing processing unit 15' digital-converts a video signal provided from terminal 13 to sequentially output a plurality of record data blocks D1, D2, D3, . . . , each corresponding to one rotation of rotary head cylinder 5, i.e. one track on tape 8. In FIG. 14, τ' indicates the period of one rotation of rotary head cylinder 5, corresponding to ½ the period τ of the first embodiment.

Figure 13:
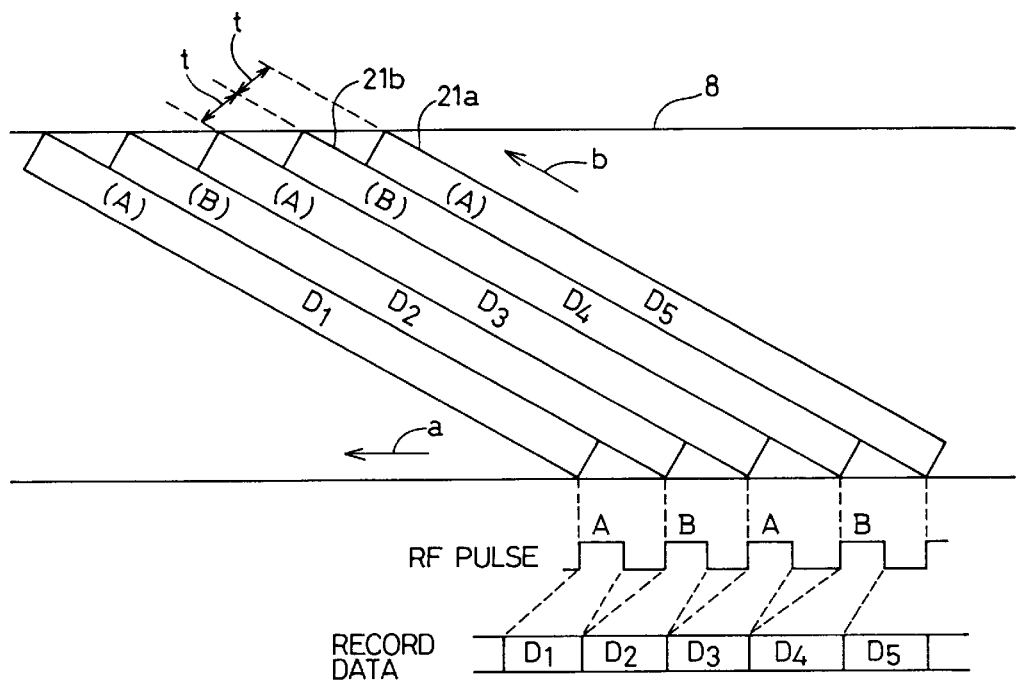
FIG. 13 shows a track pattern in an SP mode of the second embodiment.

In a recording operation of the SP mode, a track 21a of a width of one track pitch t of azimuth A and a track 21b of a width of one track pitch t of azimuth B are alternately formed by head units 7a' and 7b', respectively, for every one rotation of rotary head cylinder 5, as shown in FIG. 13. As a result, a track pattern identical to that of the first embodiment of FIG. 7 is formed on tape 8.

In an LP mode having a recording/reproduction time period 2 times that the SP mode, the travel speed of magnetic tape 8 is reduced to ½ the tape travel speed of the SP mode, while the rotation speed of rotary head cylinder 5 is the same as in the SP mode, similar to the above-described first embodiment. As a result, the scan position on tape 8 by the pair of head units 7a' and 7b' is shifted by one track pitch t for every 2 rotations of rotary head cylinder 5 as shown in FIG. 15.

In the SP mode, switch 22 is controlled by timing control circuit 24 to be closed during a period corresponding to half a rotation of every other rotation of rotary head cylinder 5. Switch 23 is controlled by head selection control circuit 25 to be alternately switched between contacts 23a and 23b for every 2 rotations of rotary head cylinder 5.

Figure 16:
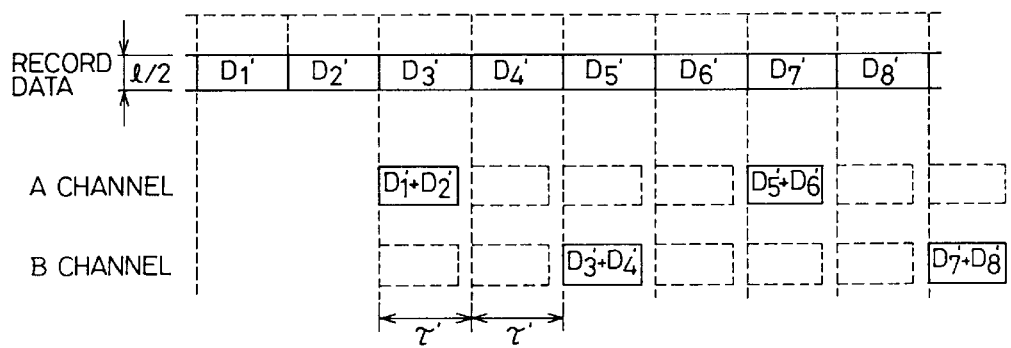
FIG. 16 shows a record data arrangement in an LP mode of the second embodiment.

Recording and reproducing processing unit 15' compresses, the time base of record data blocks D1, D2, D3, . . . of FIG. 14 to form and output a plurality of data blocks D1', D2', D3', . . . each having the amount of data reduced to ½, as shown in FIG. 16. The output plurality of recording data blocks are alternately distributed as a combination of record data blocks D1'+D2' as the data of channel A, D3'+D4' as data of channel B, . . . for each one rotation of every other rotation of rotary head cylinder 5 to be provided to the pair of head units 7a' and 7b' by switch 23.

Figure 15:
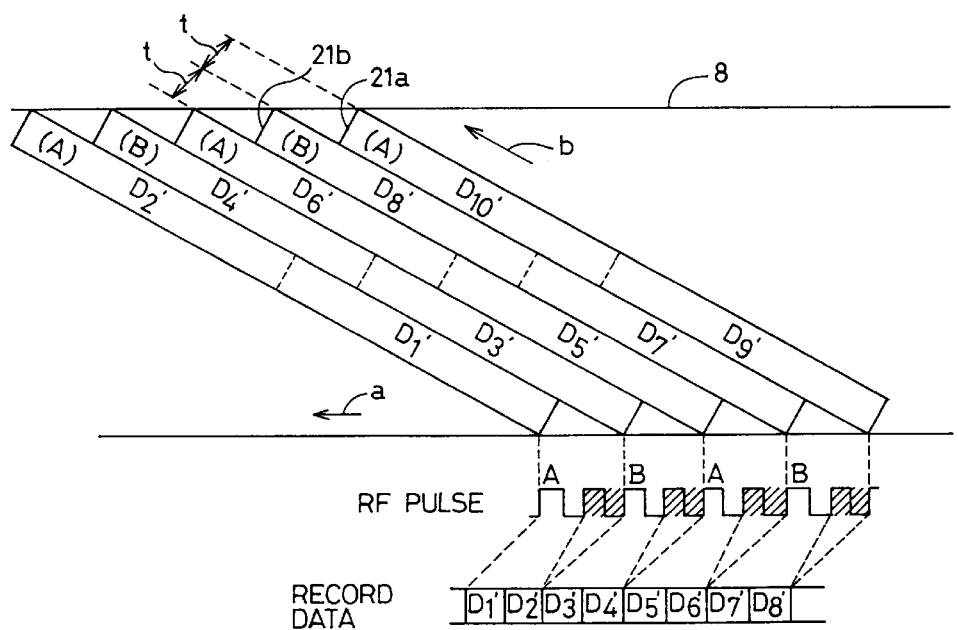
FIG. 15 shows a track pattern in an LP mode of the second embodiment.

In a recording operation of the LP mode, a track 21a of a width of one track pitch t of azimuth A and a track 21b of a width of one track pitch t of azimuth B are alternately formed on tape 8 by head unit 7a' and head unit 7b', respectively, for each one rotation of every other rotation of rotary head cylinder 5, as shown in FIG. 15. As a result, a track pattern identical to that of the first embodiment of FIG. 9 is formed on tape 8.

Thus, according to the second embodiment of the present invention, the same track on tape 8 is helical scanned sequentially for every one rotation of rotary head cylinder 5 by a double azimuth head 6' including a pair of magnetic head units 7a' and 7b' mounted on rotary head cylinder 5 with no difference in level. In the SP mode, the head scan position on tape 8 is shifted by one track pitch for every one rotation of rotary head cylinder 5, whereby head units 7a' and 7b' are selected alternately for every one rotation of rotary head cylinder 5. Therefore, an azimuth system recording/reproduction is allowed with a track pattern of the predetermined track pitch. In the LP mode having a recording/reproduction time period N times that of the SP mode, head units 7a' and 7b' are alternately selected for every one track pitch shift of the head scan position on tape 8 for every N rotations of rotary head cylinder 5, similar to the SP mode. Therefore, an azimuth system recording/reproduction is allowed with the track pattern of the track pitch identical to that of the SP mode.

According to the second embodiment of the present invention, the tape travel speed is reduced to 1/N the tape travel speed of a SP mode while maintaining the rotation speed of rotary head speed 5 identical to that of a SP mode, so that an azimuth recording/reproduction is allowed while maintaining a track pitch identical to that of the SP mode. Therefore, an effect similar to that of the above-described first embodiment can be obtained.

A magnetic recording/reproduction apparatus according to a third embodiment of the present invention will be described hereinafter with reference to FIG. 17. Although the present invention relates to a magnetic recording/reproduction apparatus including 2n (n is an integer of at least 2) magnetic heads, and including a first mode in which the tape is caused to run at a constant speed, and a second mode in which the tape speed is reduced to 1/m (m is an odd number of 1<m<2n), an embodiment is described where n=2 and m=3 for the sake of simplification hereinafter.

Figure 17:
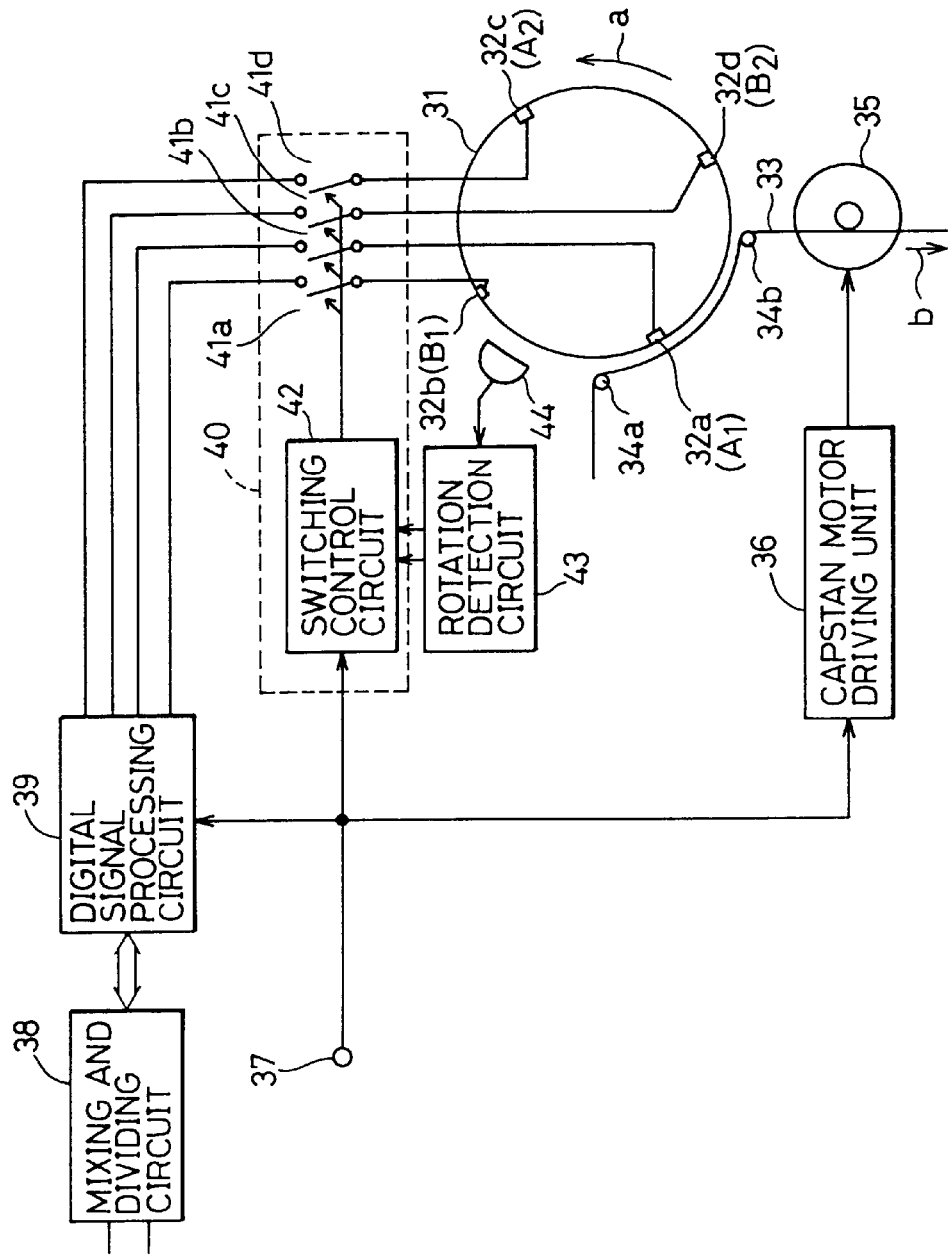
FIG. 17 is a block diagram schematically showing a magnetic recording/reproduction apparatus according to a third embodiment of the present invention.
Figure 18:
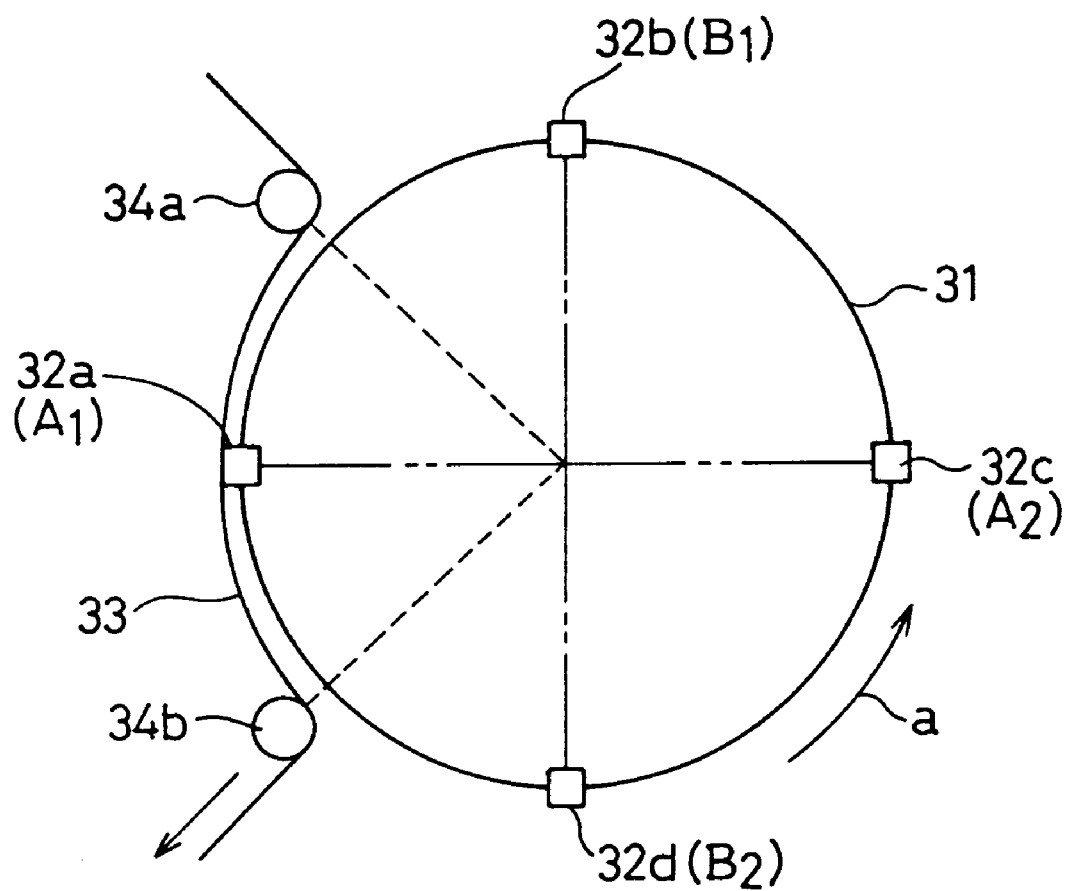
FIG. 18 is a plan view schematically showing a head arrangement of the third embodiment.

Referring to FIG. 17, a magnetic recording/reproduction apparatus according to a third embodiment of the present invention includes a rotary head cylinder 31 rotating in the direction of arrow "a", and having 4 (=2n) magnetic heads 32a, 32b, 32c and 32d mounted on the circumferential face thereof. More specifically, magnetic heads 32a–32d are arranged on the circumferential face of rotary head cylinder 31 with substantially equal intervals, that is, 90° (=360°/2n) between adjacent heads, as shown in the plan view of FIG. 18. Heads 32a–32d are disposed so that adjacent heads have different azimuth. For example, in FIGS. 17 and 18, the magnetic heads are disposed so that one pair of opposing heads 32a and 32c have azimuth A, and the other pair of opposing heads 32b and 32d have azimuth B opposite to azimuth A.

By a pair of tape guides 34a and 34b provided in the proximity of rotary head cylinder 31, a magnetic tape 33 is wound around rotary head cylinder 31 over an angle of, for example, 90°, to be caused to run in the direction of arrow "b" by the rotation of capstan motor 35 during recording/reproduction. It is to be noted that the present invention is not limited to the above-described tape wrap angle of 90°.

From a system controller (not shown) entirely controlling the entire magnetic recording/reproduction apparatus, a mode signal specifying whether recording/reproduction is to be carried out in a first mode such as a SP mode or a second mode such as a LP mode is provided to a mode terminal 37. The mode signal applied to mode terminal 37 is provided to a capstan motor driving unit 36, a digital signal processing circuit 39, and a head switching unit 40.

Capstan motor driving unit 36 responds to a mode signal to drive the rotation of capstan motor 35 so that the tape travel speed is set to V when the first mode is specified, and reduced to V/3 (=V/m) when the second mode is specified.

Rotary head cylinder 31 is driven by a cylinder motor (not shown) to be rotated in the direction of arrow "a" at the same rotation speed regardless of whether the first mode or the second mode is specified.

In a recording operation, analog video signal and audio signal are digitalized by an analog-digital converter (not shown) to be provided to a mixing and dividing circuit 38. Mixing and dividing circuit 38 once combines the provided digital video and audio data and then divides the same into 4 channels. The divided data is applied to digital signal processing circuit 39. Digital signal processing circuit 39 responds to the mode signal from terminal 37 to selectively carry out a parallel recording process or a parallel reproduction process of 4 channels. More specifically, in a recording operation, a synchronization code and an ID code for data identification, and an inner code parity for random error correction are added to each data of the 4 channels provided from mixing and dividing circuit 38 by an SYNC.ID adding circuit, an inner code adding circuit and a parity adding circuit, all provided for each channel but not shown, forming digital signal processing circuit 39. By a coding circuit (not shown) of each channel included in digital signal processing circuit 39, channel coding suitable for the magnetic recording/reproduction system characteristics is applied on the data of each channel.

In order to increase the bit rate in recording/reproducing, a high efficiency coding process by time base compression such as a DCT coding process is applied on each channel data during this channel coding process. The four channel data subjected to a recording process from digital signal processing circuit 39 are selectively applied to heads 32a–32d by control of head switching unit 40 which will be described afterwards.

Representing the magnetic heads 32a–32d mounted on rotary head cylinder 31 by $A_1$, $B_1$, $A_2$, $B_2$, respectively, in the rotating direction order, the heads abut against tape 33 in the order of $A_1$, $B_1$, $A_2$, $B_2$ by a single rotation of rotary head cylinder 31, whereby tape 33 is helical-scanned sequentially to form tracks.

In a reproduction operation, signals from heads 32a–32d are selectively reproduced in sequence to be provided to digital signal processing circuit 39 as reproduced data of 4 channels under control of head switching unit 40 which will be described afterwards. Here, digital signal processing circuit 39 is switched to a reproduction process mode in response to a mode signal. Reproduced data of each channel is subjected to time base expansion and coding by a decoding circuit (not shown) of each channel forming digital signal processing circuit 39. Then, reproduced data of each channel is subjected to random error correction, time base correction for removing jitter by an inner code error correction circuit and time base correction circuit not shown for each channel forming digital signal processing circuit 39.

The four channel reproduced data subjected to the above-described various processes by digital signal processing circuit 39 are channel-combined by mixing and dividing circuit 38 to be separated into a video signal and an audio signal. These output signals are converted into analog data by a digital-analog converter not shown, whereby video and audio are respectively reproduced.

Head switching unit 40 includes 4 channel switches 41a–41d comprised of analog switches or the like independently opening/closing the connection between the 4 channel outputs of digital signal processing circuit 39 and heads 32a–32d, respectively, and a switching control circuit 42, formed by of a microcomputer, controlling switches 41a–41d. A sensor 44 is provided in the proximity of rotary head cylinder 31. Sensor 44 includes a pulse generator (PG) and a frequency generator (FG), for detecting the phase and the frequency of the rotation of rotary head cylinder 31 to generate pulses. Rotation detection circuit 43 responds to a pulse output of sensor 44 for generating a PG signal in synchronization with the rotation phase of rotary head cylinder 31 and a FG signal in synchronization with the rotation frequency of cylinder 31. These signals are provided to switching control circuit 42.

Switching control circuit 42 responds to these PG and FG signals and a mode signal provided from terminal 37 to selectively close switches 41a–41b, whereby heads 32a–32d are selectively selected as a recording or reproduction head.

The recording/reproduction operation in the first and second modes according to the third embodiment of the present invention will be described in detail hereinafter.

(1) First Mode

In the first mode, switching control circuit 42 switches a closed one of switches 41a and 41d to another switch corresponding to the head which is going to abut against tape 33 next, every time the head abutting against tape 33 is changed when rotary head cylinder 31 rotates by approximately 90° (=360°/2n), whereby heads 32a–32d are sequentially selected as a head for recording or reproduction.

Figure 19:
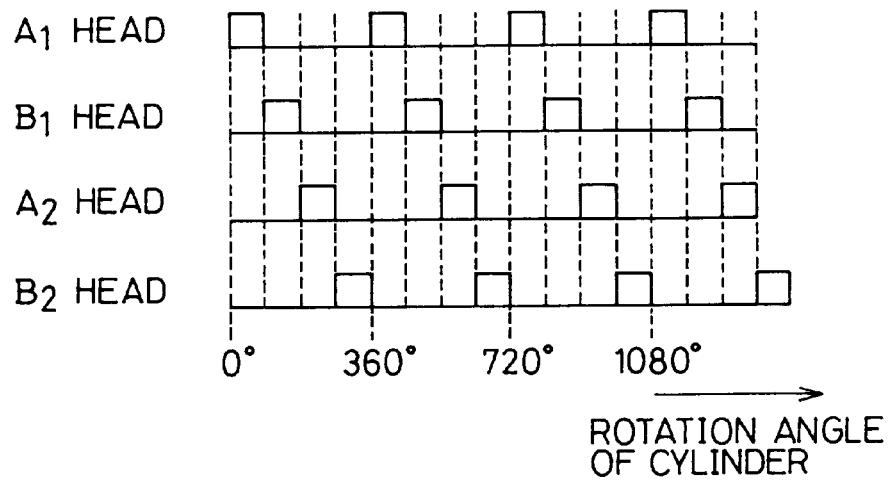
FIG. 19 shows the timing of head switching in an SP mode of the third embodiment.
Figure 20:
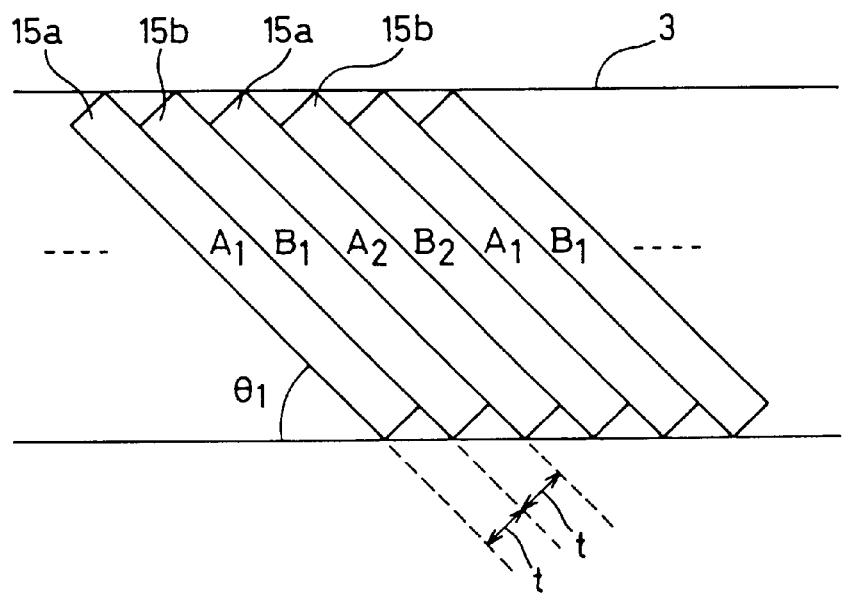
FIG. 20 shows an track pattern in a SP mode of the third embodiment.

FIG. 19 shows the relationship between the rotation phase of cylinder 31 and the selected sequence of the heads in the first mode. Heads 32a–32d are selectively selected as a recording or reproduction head for every sequential change of a head abutting against tape 33 when rotary head cylinder 31 is rotated by 90°, as shown in FIG. 19, whereby tape 33 is helical-scanned. Thus, a track pattern is formed on tape 33 in which a track 15a of azimuth A having a width of track pitch t and a track 15b of azimuth B having a width of track pitch t are alternately arranged, as shown in FIG. 20.

(2) Second Mode

In the second mode, switching control circuit 42 switches a closed one of switches 41a and 41d to another switch corresponding to the head which is going to abut against tape 33 next, for every 3 changes of the head abutting against tape 33 when rotary head cylinder 31 is rotated by approximately 270° (=360°m/2n), whereby heads 32a–32d are selected as a head for recording or reproduction at 2 (=m−1) intervals of heads in the rotating direction of rotary head cylinder 31. The rotation speed of rotary head cylinder 31 is maintained identical to that of the first mode, while the travel speed of tape 33 is reduced to ⅓ (=1/m) the travel speed in the first mode.

Figure 21:
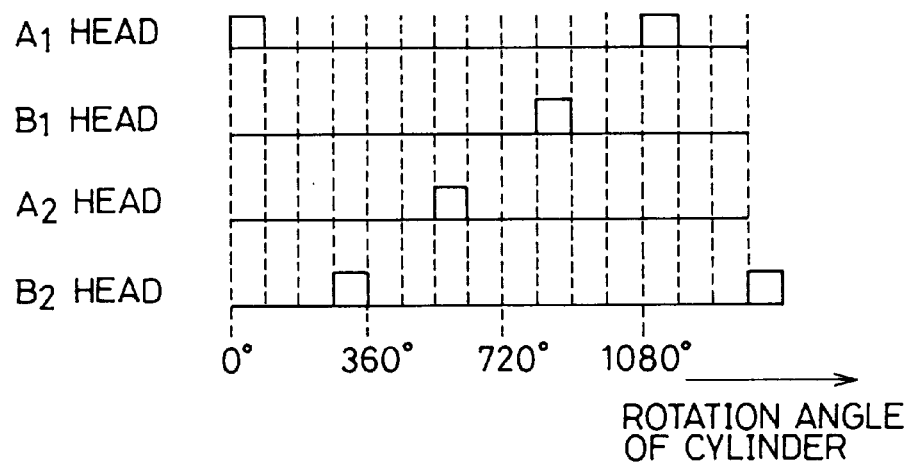
FIG. 21 shows the timing of head switching in an LP mode of the third embodiment.

FIG. 21 shows the relationship between the rotation phase of rotary head cylinder 31 and the selected sequence of the heads in the second mode. As shown in FIG. 21, heads 32a–32d are selectively selected as a recording or reproduction head for every 3 changes of the head abutting against tape 33 when rotary head cylinder 31 is rotated by 270°.

More specifically, a helical scanning period is 3 times that the first mode by a scanning operating for every 270° rotation phase of rotary head cylinder 31, i.e. at 2 (=m−1) intervals of heads. By a helical scanning system of 3 times the period and the reduction of tape travel speed to ⅓, track 15a of azimuth A and track 15b of azimuth B each having a width of a track pitch t identical to that of the first mode of FIG. 20 are formed alternately, as shown in FIG. 22.

Figure 22:
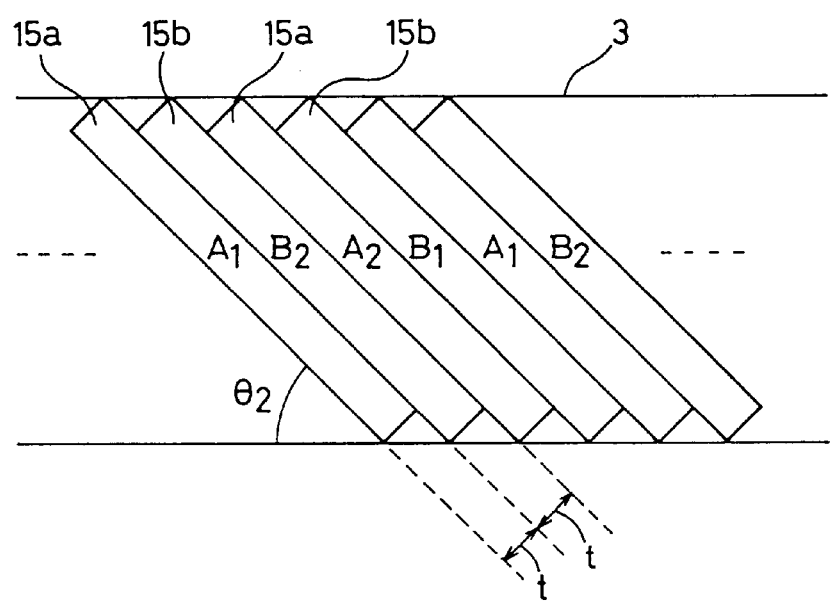
FIG. 22 shows a track pattern in an LP mode of the third embodiment.

Since rotary head cylinder 31 is rotated at a constant speed irrespective of which mode is specified, there is deviation in the track pattern on tape 33 between the modes in the strictest sense, as appreciated from the comparison of the track patterns shown in FIGS. 20 and 22. More specifically, there is a difference between an inclination $\theta_1$ of the track pattern of the first mode (FIG. 22) and an inclination $\theta_2$ of the track pattern of the second mode (FIG. 22).

Because the rotation speed of rotary head cylinder 31 is set sufficiently higher than the travel speed of tape 33, there is little difference in track pitch t between the modes, and the inclination of $\theta_2$ of the track pattern is only slightly smaller than $\theta_1$. Therefore, the difference in the track pattern between the modes can be neglected in practical usage.

By employing a simple mechanism control that changes only the tape travel speed according to a mode with the same rotation speed of rotary head cylinder 31 according to the third embodiment of the present invention, azimuth recording/reproduction of 2 modes differing in the amount of information for recording/reproduction per time on tape 33 can be carried out with the same track pitch t.

Assuming that the first mode is an SP mode and the second mode is an LP mode according to azimuth recording/reproduction of these two modes, recording/reproduction of the SP mode and the LP mode having a recording/reproduction time period three times that of the SP mode of current television broadcasting such as NTSC and PAL can be carried out without narrowing the track pitch in the LP mode.

More specifically, the recording/reproduction bit rate of tape 33 is set to $\alpha_1$ and the shortest record wavelength thereof is set to $\lambda_1$ in the first mode, and the recording/reproduction bit rate of tape 33 is set to $\alpha_2$ and the shortest record wavelength is set to $\lambda_2$ in the second mode. In this case, if the shortest record wavelength $\lambda_2$ of the second mode satisfies $\lambda_2 = \lambda_1$ according to the characteristics of heads 32a–32d and tape 33, a high efficiency coding process is not carried out in the first mode. Only in the second mode, the record data of each channel is time base compressed by a high efficiency coding process by digital processing circuit 39 to increase the bit rate $\alpha_2$ of the second mode to $\alpha_2 = \alpha_1/3$ equivalently.

According to this increase in the bit rate in the second mode, recording/reproduction of an SP mode can be carried out in the first mode, while an LP mode of 3 times the time period can be carried out in the second mode. Because the track pitch t on tape 33 is substantially the same regardless of the mode, the track pitch is prevented from being narrowed in the LP mode, to prevent reduction in the S/N ratio of the reproduced signal in the LP mode. Furthermore, compatibility between different apparatuses can be ensured in the LP mode.

When the margin of the characteristics of heads 32a–32d and tape 33 are sufficient, the bit rate can be actually increased to carry out recording/reproduction in the second mode without applying a high efficiency coding process in the second mode by setting the shortest record wavelength $\lambda_2$ in the second mode to $\lambda_2 = \lambda_1/3$ to carry out a high density recording three times the recording density of the first mode on tape 33.

A similar result can be obtained even by setting the bit rate $\alpha_2$ and the shortest record wavelength $\lambda_2$ of the second mode to satisfy the conditions of $\alpha_2 = \alpha_1/2$ and $\alpha_1 \cdot \lambda_1 = 3 \cdot \alpha_2 \cdot \lambda_2$.

When the mode of recording and reproducing a high definition television broadcasting having a great amount of information is the first mode and the mode of recording and reproducing the current television broadcasting is the second mode, recording/reproduction of high definition television broadcasting and current television broadcasting can be carried out with the same track pitch t. Furthermore, recording/reproduction of a long time period of a LP mode can be carried out for the current television broadcasting.

Figure 23:
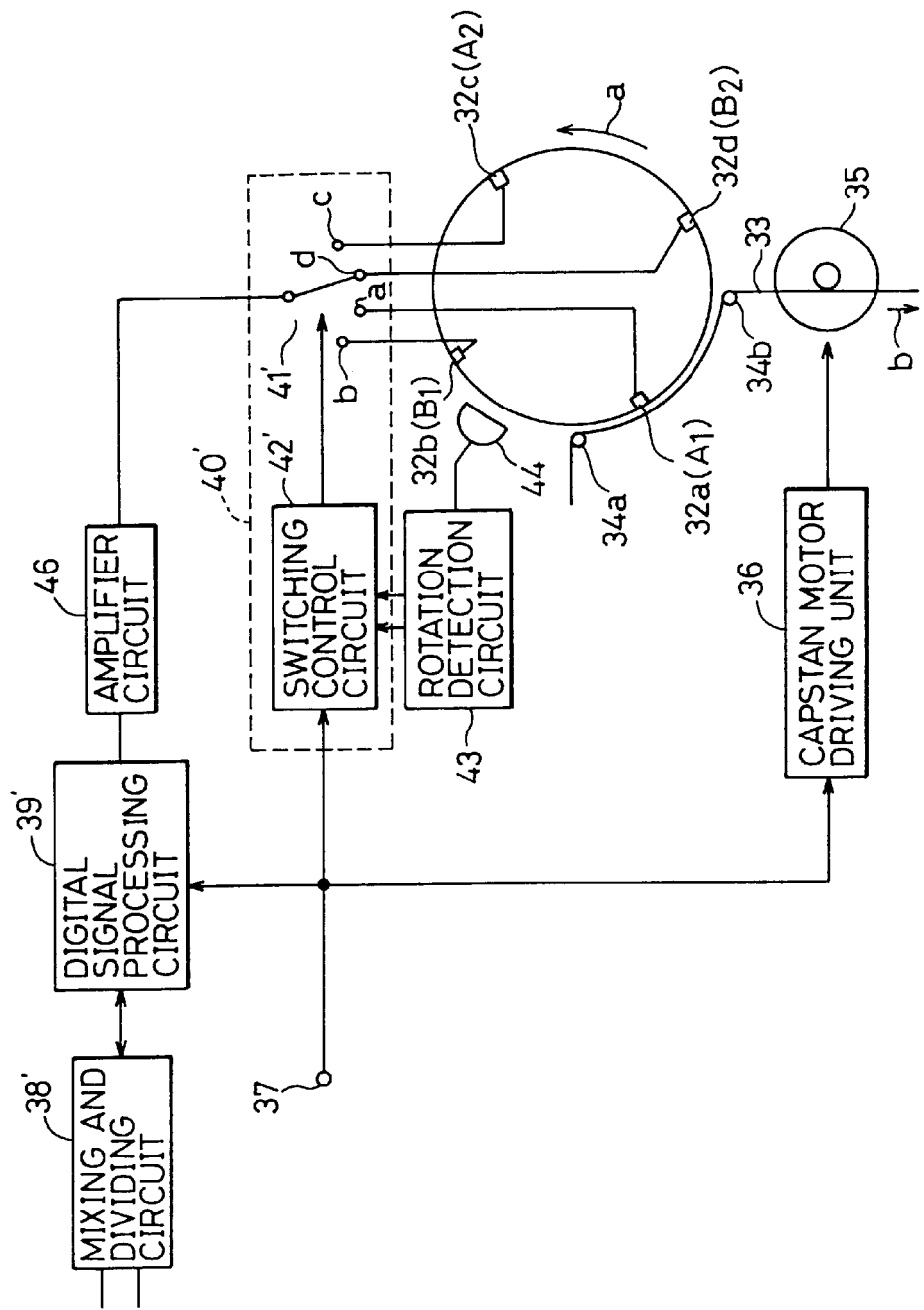
FIG. 23 is a block diagram schematically showing a magnetic recording/reproduction apparatus according to a fourth embodiment of the present invention.

A fourth embodiment of the present invention will be described with reference to FIG. 23. The fourth embodiment of FIG. 23 is similar to the third embodiment shown in FIG. 17 except for the points set forth in the following. Therefore, the description of common elements will not be repeated.

Instead of the 4-channel mixing and dividing circuit 38 of FIG. 17, a single-channel mixing and dividing circuit 38' is provided. Mixing and dividing circuit 38' combines the applied digital video and audio data to form record data of a single channel which is provided to a digital signal processing circuit 39' in a recording operation. In a reproduction operation, reproduced data of a single channel provided from digital signal processing circuit 39' is separated into video and audio data for output.

Instead of the 4-channel digital signal processing circuit 39 of FIG. 17, a digital signal processing circuit 39' formed of a circuit corresponding to a single channel of digital signal processing circuit 39 is provided. Digital signal processing circuit 39' processes record data of a single channel from mixing and dividing circuit 38' to provide the same to an amplifier circuit 46 for buffering in a recording operation. In a reproduction operation, reproduced data of a single channel from amplifier circuit 46 is processed to be provided to mixing and dividing circuit 38'.

Instead of switches 41a–41d of FIG. 17, a switch 41' having 4 contacts a–d is provided between amplifier circuit 46 and heads 32a–32d. Switch 41' is switched in synchronization with the rotation of rotary head cylinder 31 by a switching control circuit 42' corresponding to switching control circuit 42 of FIG. 17. A head control unit 40' is formed of switch 41' and switching control circuit 42'.

Switching control circuit 42' switches switch 41' according to a mode signal provided from terminal 37 and signals from detection circuit 43 indicating the rotation phase and rotation frequency of rotary head cylinder 31. In response to this switching operation, record data of a single channel provided from amplifier circuit 46 is divided into 4 channels to be selectively provided to heads 32a–32d in a recording operation. In a reproduction operation, reproduced data of 4 channels based on reproduced signals of heads 32a–32d are combined into reproduced data of a single channel to be provided to amplifier circuit 46. As a result, the digital signal processing circuitry is simplified to a structure of a single channel while obtaining an effect similar to that of the above-described third embodiment.

Although the third and fourth embodiments were described in which n=2 and m=3 with 4 heads 32a–32d are provided, a similar effect can be obtained by setting n to an integer greater than 2 and m to an odd number satisfying 1<m<2n with 2n magnetic heads being provided. For example, when n is set as n=3, m may be either 3 or 5.

Although the third and fourth embodiments were described in which tape 33 is wound around rotary head cylinder 31 over an angle of 90°, the tape may be wound around the cylinder over an angle other than 90°. If the cylinder wound angle of tape 33 is set to 270°, for example, in the above-described third and fourth embodiments, continuous recording/reproduction can be carried out even in the second mode, and time base compression in the coding process can be eliminated.

The present invention is not limited to a digital VTR, and is applicable to a magnetic recording/reproduction apparatus of various helical scan systems that carry out digital and/or analog recording/reproduction. Although it is generally desirable to set the number of heads so that continuous recording/reproduction can be carried out in the second mode when analog recording/reproduction is to be carried out, it is not necessary to carry out recording/reproduction continuously in the second mode when the present invention is applied to a time lapse type VTR. Furthermore, the present invention is not limited to a magnetic recording and reproduction apparatus, and is applicable to a recording dedicated apparatus or a reproduction dedicated apparatus.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magnetic recording/reproduction apparatus of an azimuth system for recording and/or reproducing a digital signal by helical-scanning a magnetic tape, including a standard play mode, and a long play mode of a recording and reproducing time period N (N is an even number) times that of said standard play mode, as recording and reproducing modes, said magnetic recording/reproduction apparatus comprising:

mode specifying input means for receiving a signal specifying one of said standard play mode and said long play mode to be executed, a rotary head cylinder driven to rotate at the same rotation speed in either of said standard play mode and said long play mode, a pair of magnetic head units having opposite azimuth, disposed in close proximity on a circumferential face of said rotary head cylinder with a difference in level therebetween corresponding to a predetermined track pitch (t) so that two continuous tracks are scanned simultaneously at said predetermined track pitch on said magnetic tape for every one rotation of said rotary head cylinder, tape speed control means for reducing the travel speed of a said magnetic tape running while being wound around said rotary head cylinder to 1/N the travel speed of said standard play mode when said long play mode is specified, signal processing means for compressing the amount of data of a digital signal to be recorded to 1/N the amount of data of the standard play mode to provide the compressed data to said pair of magnetic head units as record data of two channels, and/or for expanding the amount of data of digital signals of two channels reproduced by said pair of magnetic head units by N times, when said long play mode is specified, and head control means for driving said pair of magnetic head units to carry out recording or reproduction by said pair of magnetic head units in a unit of said two continuous tracks on said magnetic tape, for every one rotation of said rotary head cylinder when said standard play mode is specified, and for every N rotations of said rotary head cylinder when said long play mode is specified, wherein said predetermined track pitch is maintained in both standard and long play modes.

2. The magnetic recording/reproduction apparatus according to claim 1, wherein said tape speed control means comprises:

a capstan motor, and driving means for controlling the rotation speed of said capstan motor according to a mode specified by said mode specifying means.

3. The magnetic recording/reproduction apparatus according to claim 1, wherein said signal processing means converts data to be recorded into a plurality of data blocks in time sequence, each corresponding to one track on a magnetic tape, and alternately distributing the same as record data of two channels, which are provided in parallel at the same time for every one rotation of said rotary head cylinder when said standard play mode is specified, and wherein said 1/N compressed data to be recorded into a plurality of data blocks in time sequence, each corresponding to a 1/N track on said magnetic tape, and alternately distributing said data blocks in N blocks as record data of two channels, which are provided in parallel at the same time for every N rotations of said rotary head cylinder when said long play mode is specified.

4. The magnetic recording/reproduction apparatus according to claim 1, wherein said head control means comprises:

switching means provided between said signal processing means and said pair of magnetic head units, pulse generation means for generating pulses in synchronization with rotation of said rotary head cylinder, and timing control means responsive to said pulses and a mode specified by said mode specifying means for opening and closing said switching means with one rotation of said rotary head cylinder as one period when said standard play mode is specified, and with N rotations of said rotary head cylinder as one period when said long play mode is specified.

5. The magnetic recording/reproduction apparatus according to claim 1, wherein said N is set as N=2, and said magnetic tape is wound around said rotary head cylinder by 180° for travel.

* * * * *